United States Patent

[11] 3,591,986

| [72] | Inventor | Ronald Aspden<br>Bedford, Mass. |
|---|---|---|
| [21] | Appl. No. | 873,046 |
| [22] | Filed | Oct. 31, 1969 |
| [45] | Patented | July 13, 1971 |
| [73] | Assignee | Itek Corporation<br>Lexington, Mass. |

[54] OPTICAL SURFACE GENERATING METHOD AND APPARATUS
20 Claims, 3 Drawing Figs.

[52] U.S. Cl. .................................................. 51/55,
51/284
[51] Int. Cl. ...................................... B24b 7/00,
B24b 9/00, B24b 1/00
[50] Field of Search............................................ 51/55, 284

[56] References Cited
UNITED STATES PATENTS

| 2,977,724 | 4/1961 | Kennedy et al. .............. | 51/55 |
| 3,118,255 | 1/1964 | Dipprey et al. ................ | 51/55 |

*Primary Examiner*—James L. Jones, Jr.
*Attorneys*—Homer O. Blair, Robert L. Nathans and Gerald H. Glanzman ABSTRACT: A surface generating system wherein an optical lap is moved over the surface of an optical blank in a path having both circumferential and oscillating radial components. Continuous and selective variation in the amplitude of the radial component produces desired radially symmetric changes on the work surface and continuous and selective variation in the magnitude of the circumferential component corrects radial asymmetries initially present on the work surface.

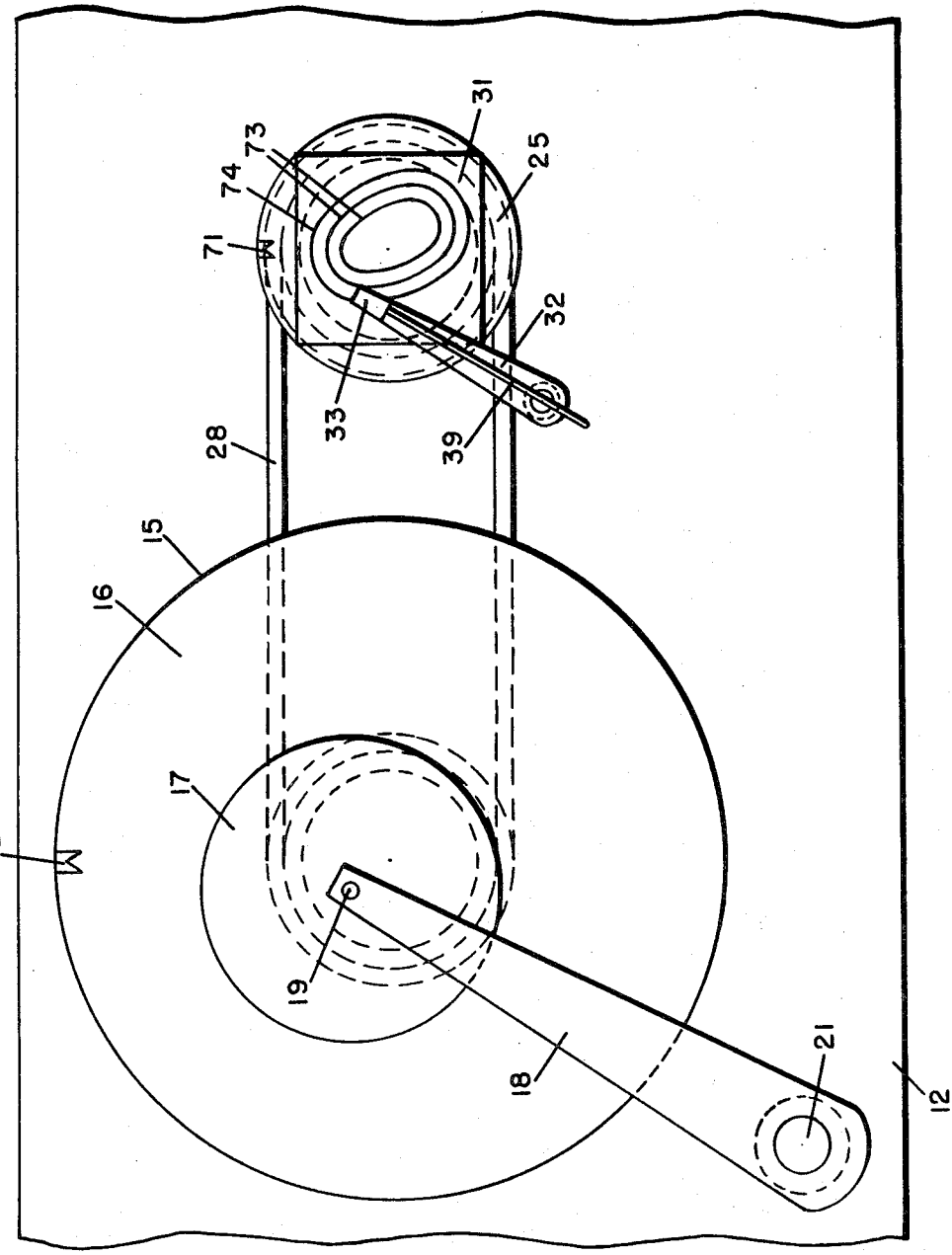

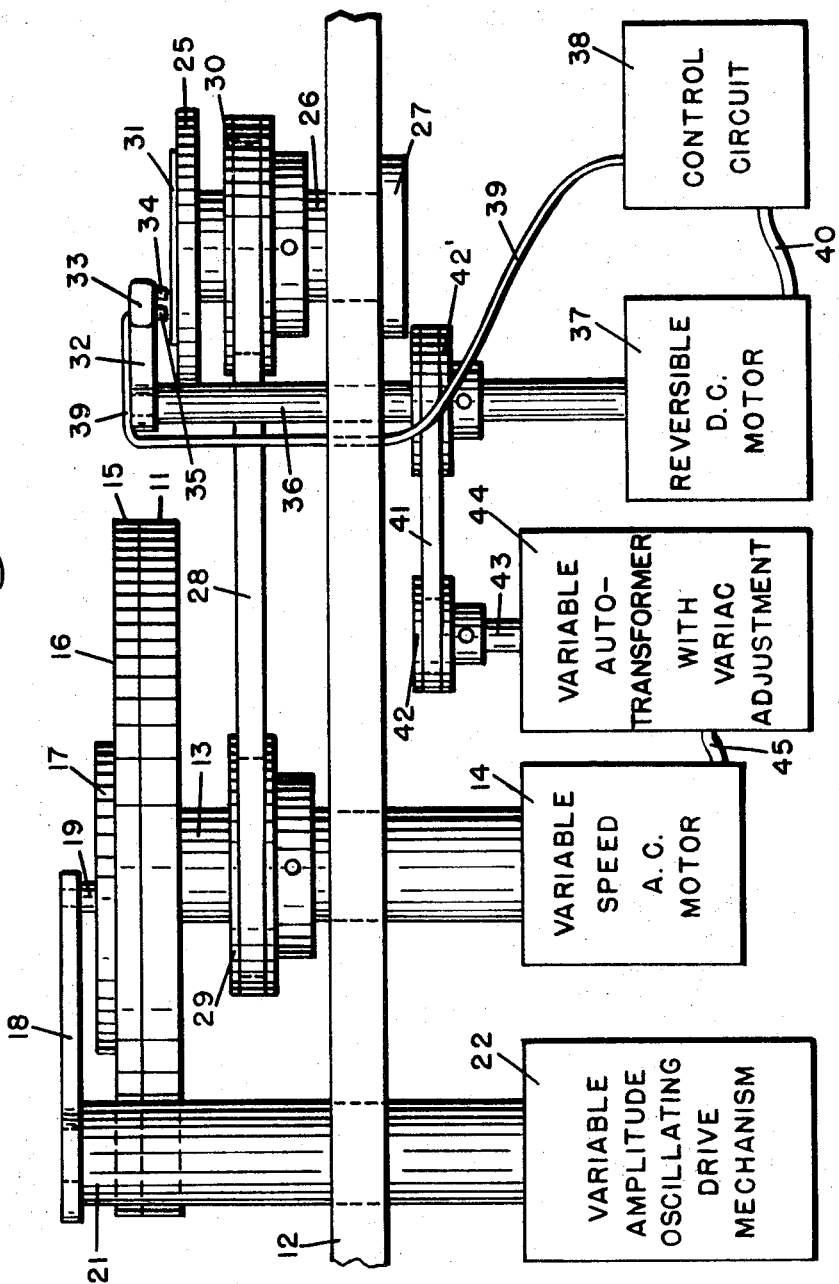

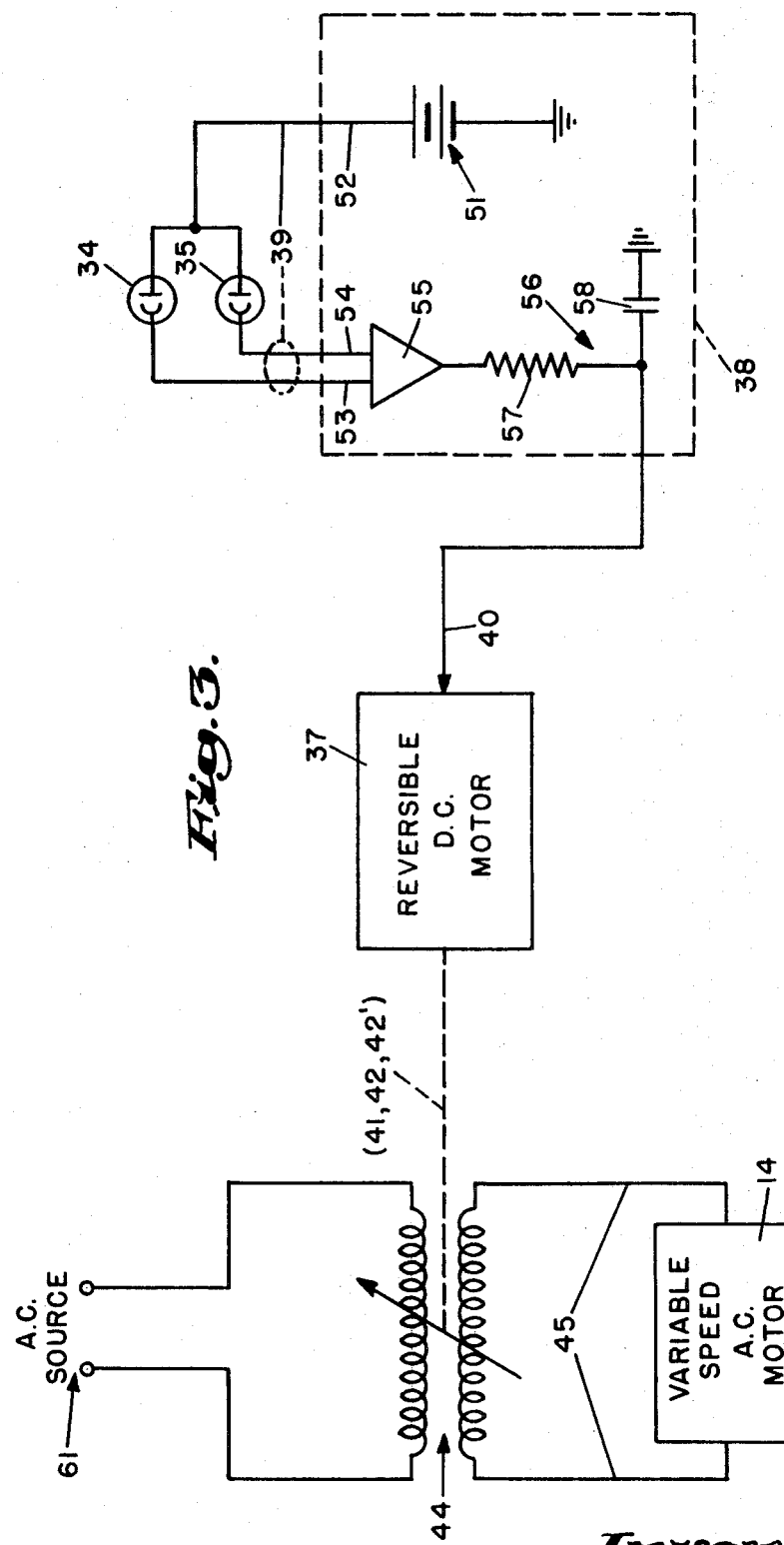

OPTICAL SURFACE GENERATING METHOD AND APPARATUS

BACKGROUND OF THE INVENTION

This invention relates generally to a method and apparatus for generating optical surfaces. More particularly, the invention relates to a method and apparatus especially suited for correcting asymmetries during the production of radially symmetric optical surfaces.

Radially symmetric optical surfaces are most commonly generated with machines that produce relative movement between an optical lap and the work surface of a suitable optical blank. The relative movement normally comprises both circumferential and radial components such that the lap periodically passes over all areas on the work surface. In a typical machine, the circumferential component is produced by rotating the optical blank and the radial component is produced by reciprocation of the lap. The particular repetitive path followed by the lap on the work surface is established by manual adjustment of the machine and during a typical polishing operation, a technician will periodically readjust the machine so as to alter the path of relative movement. These periodic modifications in the paths of relative movement are made in attempts to produce a desired surface contour and are made according to completely empirically developed techniques.

The generation of radially symmetric surfaces with machines of this type suffers from a number of disadvantages including the requirement for highly skilled technicians, lengthy processing periods, and insufficient degrees of reliability and precision. Many of these difficulties are alleviated by an improved optical device disclosed in the applicant's copending U.S. Pat. application Ser. No. 724,082 filed May 25, 1968, now U.S. Pat. No. 3,566,544, and entitled "Optical Surface Generating Method and Apparatus". The machine therein described includes an automatic control mechanism that permits continuous and selective variation in the amplitude of the reciprocating lap motion. According to the surface generation method disclosed, an analysis is first made of an optical blank to determine the relative number of lap center traversals that are required along radially spaced positions on the blank's work surface to produce the desired surface contour. The information obtained is used to program a control mechanism which then randomly varies the amplitude of the reciprocating lap so as to generate the required lap traversal relationship. Although the specific embodiment disclosed in that application utilizes cam surfaces as controlling devices, other well-known control mechanisms including other well-known mechanical guides and sensors, magnetic tapes and readers, electrical digital counters, electrical timers, digital or analog computers are suggested as suitable alternatives.

A further improvement of above noted surface generating machine is disclosed in the applicant's copending U.S. Pat. application Ser. No. 816,683 filed Apr. 16, 1969, now U.S. Pat. No. 3,546,776, and entitled "Optical Surface Generating Method and Apparatus". The improvement prevents a fortuitous nonuniform circumferential distribution of the individual variable amplitudes which would cause surface asymmetries to be generated. According to a preferred method disclosed in the latter application, an optical lap is moved transversely over the centrally curved surface of an optical blank in a path having both circumferential and oscillating radial components. As in the earlier embodiment the amplitude of the oscillating radial component is continuously varied so as to generate on the work surface a desired contour change. In addition, however, the varying amplitudes of the radial component are selected so as to produce direction reversals thereof when the lap is sequentially adjacent different predetermined sectors of the work surface. By correlating radial component direction reversals with the relative circumferential position existing between the lap and work surface at the time of the reversals, one is able to control the circumferential distribution of surface changes produced on the work surface by the reciprocating lap. In a specifically disclosed embodiment, the work surface is figuratively divided into a given number of sectors and the varying amplitudes produce a predetermined relative number of the lap movement direction reversals adjacent each of a given number of radial positions on the work surface. By equalizing the number of direction reversals that occur in each sector adjacent each of the given number of radial positions, one insures that only symmetrical surface changes will be produced on the work surface.

Although effective for their stated objectives, the optical surface generating machines disclosed in the above-noted patent applications are not capable of introducing asymmetrical surface changes. Thus, the correction of rotational asymmetries existing on astigmatic surfaces is not possible. The object of this invention, therefore, is to provide a relatively simple optical surface generating machine that will automatically correct rotational asymmetries on an optical blank's work surface while generating desired rotationally symmetric surfaces changes thereon.

CHARACTERIZATION OF THE INVENTION

The invention is characterized by the provision of an optical surface generating machine wherein a surface modifying device is radially reciprocated along the work surface of a rotating optical blank thereby providing therebetween relative movement having both circumferential and oscillating radial components. By continuously varying the amplitude of the radial component produced by the oscillating lap in a predetermined programmed manner, desired rotationally symmetric surface changes are generated on the surface of the optical blank. In addition, rotational asymmetries initially present on the work surface are eliminated by continuously varying the rotational speed of the optical blank in response to information retained by a suitable guide mechanism. The information retained by the guide identifies initial asymmetries on the work surface and is obtained, for example, by conventional optical interferographic techniques.

According to a preferred embodiment of the invention, the surface modifying mechanism is an optical lap that removes material from the optical blank's work surface. In this case the rotational speed of the blank is varied inversely with respect to the initial relative elevations of the work surface portions in contact with the lap. Thus, longer working periods are provided in relatively high circumferential portions of the rotating work surface and shorter working periods are provided in relatively low circumferential portions of the work surface.

Another feature of the invention is the provision of a surface generating machine of the above type including a sensing head supported above an interferogram guide in a circumferential position corresponding to the circumferential position occupied by the optical lap on the work surface of the blank. The sensing head is controlled for radial movement above the interferogram guide so as to follow a given fringe thereon and a control circuit produces a control signal responsive to the radial position of the head. This control signal has a value proportional to the radius of the sensed fringe at the point adjacent the sensing head which is in turn proportional to the relative elevation of the optical blank's work surface in contact with the optical lap. Thus, by using this control signal to vary the rotational speed of the optical blank, the desired speed relationship is obtained.

Another feature of this invention is the provision of an optical surface generating method wherein the work surface of an optical blank is examined to locate rotational asymmetries. Information regarding the circumferential locations of the rotational asymmetries is recorded on a suitable guide mechanism that is used to variably control rotational speed of the optical blank during polishing operations with an optical lap. By providing an inverse relationship between the rotational speed of the optical blank and the relative elevation of the blak's work surface in contact with the optical lap, polishing periods of increased length are produced in relatively high surface areas thereby tending to correct rotational asymmetries.

DESCRIPTION OF T DRAWINGS

These and other objects and features of the present invention become more apparent upon a perusal of the following specification taken in conjunction with the accompanying drawings wherein:

FIG. 1 is a schematic plan view of a preferred embodiment of the invention;

FIG. 2 is a schematic front elevational view of the embodiment shown in FIG. 1; and FIG. 3 is a schematic diagram of the control circuit shown in FIG. 2.

DESCRIPTION OF A PREFERRED EMBODIMENT

Referring now to FIGS. 1 and 2 there is shown a primary turntable 11 mounted above a partially shown cabinet top 12. The primary turntable 11 is keyed to a drive shaft 13 that is rotatably driven by a variable speed AC motor 14. Supported by the primary turntable 11 and rotated therewith is an optical blank 15. Surface modifications of the optical blank's work surface 16 are affected by contact with an optical lap 17. Guiding movement of the lap 17 over the work surface 16 is an arm 18 having one end fixed to the lap 17 by a pin 19 and an opposite end secured to a pivot shaft 21. A variable amplitude drive mechanism 22 controls rotation of the pivot shaft 21 so as to produce variable amplitude reciprocating radial movement of the lap 17 along the work surface 16.

An auxiliary turntable 25 is keyed to a rotatable shaft 26 supported from the cabinet top 12 by a bearing assembly 27. A drive belt 28 transmits rotary motion of the drive shaft 13 to the drive shaft 26 via belt pulleys 29 and 30 which have identical diameters so as to insure equal rotational speeds for the primary turntable 11 and the auxiliary turntable 25. Supported by the auxiliary turntable 25 and rotated therewith is a guide disc 31 retaining information regarding the initial surface contour on the optical blank's work surface 16. Preferably, the disc guide 31 comprises a "bullseye" interferogram of the work surface 16. One end of an arm 32 supports a sensing head 33 including a pair of photocells 34 and 35. The other end of the pivot arm 32 is fixed to a shaft 36 that is rotated by a reversible DC motor 37.

Electrical connections between the sensing head 33 and a control circuit 38 is provided by an electrical cable 39. A drive belt 41 and accommodating belt pulleys 42 and 42' operatively couple the motor shaft 36 to an adjustment shaft 43 of a variable autotransformer 44 that includes a range selection variac adjustment. The autotransformer 44 is connected to a suitable input source of a AC power (not shown) and provides an output drive voltage to a variable speed AC motor 14 on an electrical cable 45.

FIG. 3 schematically illustrates an electrical control system for the machine shown in FIGS. 1 and 2. Included in the control circuit 38 shown in FIG. 2 is a power supply 51 that applies a DC voltage to the photocells 34 and 35 on line 52. Outputs of the photocells 34 and 35 on lines 53 and 54, respectively, are fed into a differential amplifier 55. The signal lines 52, 53 and 54 are included in the electrical cable 39 shown in FIG. 2. Removing transients from the output of the differential amplifier 55 is an integrating network 56 including a resistor 57 and a capacitor 58. The output of the integrating network 56 is applied on line 40 to the reversible DC motor 37 shown in FIG. 2. As also shown in FIG. 2, the reversible DC motor is operatively coupled to the variable autotransformer 44 by the drive belt 41 and associated pulleys 42 and 42'. The transformer 44 transforms the voltage received from an AC supply 61 into a selectively variable output voltage that is applied on lines 45 to the variable speed AC motor 14.

Before proceeding with alterations of the optical blank 15, the work surface 16 is examined to determined its initial contour characteristics. Also, information is derived regarding the radially symmetric changes required to generate on the work surface 16 a desired radially symmetric surface. This information is used to produce a suitable control element with control indicia indicating the relative number of lap traversals required in spaced annular regions of the work surface 16 to generate the desired surface change thereon. In response to the control indicia the oscillating drive mechanism 22 varies the amplitude of the lap's 17 radial movements on the work surface 16 so as to produce in each region thereof the required relative number of lap traversals. The precise manner in which the oscillating drive mechanism 22 varies the amplitude of the lap's oscillations does not, per se, form a part of this invention. However, more detailed explanations of this operation are disclosed in the above-noted U.S. Pat. applications Ser. Nos. 724,082 and 816,683.

After initial examination of the optical blank 15, the guide 31 retaining information relating to radial asymmetries on the work surface 16 is produced. Preferably, the surface examination is made by conventional interferographic techniques and the guide 31 comprises a "bullseye" interferogram of the type schematically illustrated in FIG. 1. In such a guide each of the fringes 73 and 74 is, in effect, a contour line representing points of equal surface elevation on the work surface 16. Thus, variations in the radial spacing between the rotational center of the guide and individual points on the fringes 73 and 74 represent radial asymmetries on the work surface 16. Furthermore, the relative magnitude of the radial spacing of a given point on a noncircular fringe indicates the relative degree of radial asymmetry existing at the corresponding point on the work surface 16. In most cases radial asymmetries have a uniform sense along a given radius of a work surface as is indicated by all fringes having substantially the same form. For example, all portions of a work surface 16 lying on a given radius may initially be high relative to a median surface elevation and this fact will be indicated by all fringes having radial displacements of a uniform sense on a corresponding radius of the interferogram guide. Consequently, a single fringe of an interferogram generally will indicate accurately radial asymmetries existing anywhere along a work surface radius corresponding to a particular point in the fringe itself. Any particular fringe, therefore, can generally be used to control correction of radial asymmetries existing in all regions of a related work surface.

After completion of the above-described procedures, the optical blank 15 is mounted on the primary turntable 11 and the interferogram guide 31 is positioned on the auxiliary turntable 25. Suitable fiducial marks 71 and 72 are used to establish relative positions for the blank 15 and guide 31 such that the optical lap 17 and the sensing head 33 are above corresponding circumferential positions on the work surface 16 and the related interferogram guide 31. This relationship is retained during operation by the equally sized belt pulleys 29 and 30 that insure equal rotational speeds for the primary turntable 11 and the auxiliary turntable 25. Thus, during polishing operations the lap 17 is always polishing a work surface portion with an initial relative elevation represented by a corresponding portion of the interferogram 31 lying directly below the sensing head 33. Furthermore, as noted above, reasonably accurate information regarding the relative elevation along any radius of the work surface 16 is derived from the relative radial spacing of a point in any of the fringes 73, 74 lying in a corresponding radius of the interferogram 31. Thus, any of the fringes 73, 74 can be selected as a primary reference for controlling corrections of radial asymmetries.

In the illustrated example of FIG. 1, the sensing head 33 is positioned directly above-selected fringe 74 which is straddled by the photodetectors 34 and 35. Subsequently, during rotation of the interferogram guide 31, the sensing head 33 is pivoted, as described below, on the arm 32 in such a manner as to maintain this straddling relationship between the photodetectors 34 and 35 and the selected fringe 74. As also described below, this controlled movement of the sensing head 33 is used to produce a control signal that varies the rotational speed of the AC motor 14 and consequently of the primary turntable 11 in such a way as to remove from the work surface 16 rotational asymmetries represented by variations in radial spacing of given points on the fringe 74.

Referring now to FIG. 3, the photodetectors 34 and 35 respond to equal levels of incident radiation by producing equal valued signal outputs o lines 53 and 54, respectively. This condition exists so long as the detectors 34 and 35 exactly straddle the adjacent fringe 74 so as to have incident radiation levels equally affected thereby. Subtraction of equal valued signals on lines 53 and 54 in the difference amplifier 55 results in no output on line 40 for energizing the DC motor 37. Consequently, the shaft 36, the arm 32 and sensing head 33 remain stationary. However, as the noncircular fringe 74 rotates, its portion directly below the sensing head 33 moves relative to the detectors 34 and 35 interrupting the above-described balanced condition. For example, as its radius decreases, the dark fringe 74 moves closer to inner photo detector 34 reducing the level of radiation incident thereon and correspondingly increasing the level of radiation incident on outer detector 35. This in turn increase the signal value on line 54 and decreases the signal value on line 53 producing an unbalanced output of one polarity from the difference amplifier 55. After integration in the integrator network 56, the resultant control signal on line 40 energizes the DC motor 37 producing rotation thereof in a given direction. The direction of rotation produced is such as to move the attached sensing head 33 radially inward above the interferogram 31 so as to reestablish the above described balanced conditions. Obviously, an increase in the radius of the fringe 74 produces, in an analogous manner, an opposite changes in the signal outputs on lines 53 and 54 so as to generate a control signal of opposite polarity on line 40. This in turn induces rotation of the DC motor 14 in an opposite direction moving the sensing head 38 outward and maintaining balanced outputs on lines 53 and 54. Thus, the control signal produced on line 40 energizes the DC motor 37 selectively so as to maintain the sensing head 33 directly above the guide fringe 74.

Considering the above, it will be apparent that the pivotal position o of the sensing head 33 and correspondingly, the rotational position of the shaft 36 are directly related to the radial position of the point on the guide fringe 74 directly below the sensing head 33. Also, as noted above, this fringe point radius indicates the initial relative elevation of the work surface 16 portion directly below the optical lap 17. Because of this relationship, the rotational position of shaft 36 can be used to control the rotational speed of the optical blank 15 so as to correct rotational asymmetries on the work surface 16 as described more fully below.

Rotation of the shaft 36 induces corresponding rotation of the autotransformer adjustment shaft 43 via the belt coupling 41, 42 and 42'. As schematically illustrated in FIG. 3, this varies the control voltage applied to the variable speed AC motor 14 on input line 45. Thus, the instantaneous speed of the AC motor 14 and the primary turntable 11 is directly dependent upon the radius of that portion of the selected fringe 74 then below the sensing head 33. The relationship between the various components is such as to decrease the speed of the primary turntable 11 in response to radius changes of the fringe 74 indicative of work surface regions having relatively high elevations and to increase the rotational speed of the primary turntable 11 in response to radius changes of the fringe 74 indicative of work surface regions having relatively low elevations.

In this way, longer polishing periods are provided in relatively high circumferential regions on the work surface 16 and shorter polishing periods are provided in relatively low circumferential regions thereof. The obvious effect of such a procedure is to reduce the degree of radial asymmetry initially present on the work surface.

Obviously, many modifications and variations of the present invention are possible in light of the above teachings. For example only, surface modifying devices other than optical laps can be employed. However, in the case of surface buildup devices such as vapor depositors, the above-described relationship between blank rotational speed and initial work surface elevations would be reversed; i.e. shorter work periods on relatively high regions and longer work periods on relatively low regions. Also, guide and control mechanisms other than those specifically shown and described can be used.

What I claimed is:

1. Optical surface generating apparatus comprising a turntable means adapted to support an optical blank, surface modifying means adapted to alter the thickness of a directly adjacent portion of an optical blank supported by said turntable means, a turntable drive means for producing variable speed rotation of said turntable, a guide receiving means adapted to accommodate guide means retaining information regarding the initial contour of the work surface of the optical blank supported by said turntable means, and speed control means for automatically varying the rotational speed of said turntable means in response to the information retained by the guide means.

2. Optical surface generating apparatus according to claim 1 wherein said speed control means continuously varies the rotational speed of said turntable means dependent upon information retained by the guide means indicating the relative elevation of that portion of the work surface directly adjacent said surface modifying means.

3. Optical surface generating apparatus according to claim 2 wherein said surface modifying means is adapted to remove material from the directly adjacent portion of the work surface.

4. Optical surface generating apparatus according to claim 3 wherein said speed control means varies the rotational speed of said turntable means inversely with respect to the relative elevations of the directly adjacent work surface portions.

5. Optical surface generating apparatus according to claim 2 wherein said speed control means comprises sensing means for interpreting the information retained by the guide means and for producing a control signal dependent upon the relative elevation of the work surface portion directly adjacent said surface modifying means.

6. Optical surface generating apparatus according to claim 5 wherein said guide receiving means is adapted to receive a guide means comprising a physical representation of the optical blank's work surface.

7. Optical surface generating apparatus according to claim 6 including auxiliary drive means for producing relative movement between said sensing means and the guide means, and synchronizing means for synchronizing the rotational movement produced by said turntable drive means and the relative movement produced by said auxiliary drive means.

8. Optical surface generating apparatus according to claim 7 wherein said auxiliary drive means is adapted to maintain between said sensing means and the guide means a relative position having a given relationship to the relative position existing between said surface modifying means and the work surface of the optical blank.

9. Optical surface generating apparatus according to claim 8 wherein said auxiliary drive means produces said relative movement by rotating said guide receiving means, and said synchronizing means maintains equal rotational speeds for said turntable means and said guide receiving means.

10. Optical surface generating apparatus according to claim 9 including said guide means and wherein said guide means comprises an interferogram of the optical blank's work surface.

11. Optical surface generating apparatus comprising blank support means for supporting an optical blank, surface modifying means adapted to alter the relative elevations on the work surface of an optical blank supported by said blank support means, drive means adapted to produce relative transverse movement having both circumferential and oscillating radial components between said surface modifying means and a supported work surface, and automatic control means for continuously and selectively varying the amplitude of said oscillating radial component and the speed of said circumferential component.

12. Optical surface generating apparatus according to claim 11 wherein said drive means produces said circumferential component of relative movement by rotating the optical blank and produces said oscillating radial component of relative movement by reciprocating said surface modifying means transversely over the work surface.

13. Optical surface generating apparatus according to claim 12 including guide receiving means adapted to accommodate guide means retaining information regarding the initial contour of said work surface, and said control means comprises sensing means adapted to interpret the information on said guide means and to provide speed control signals for controlling the rotational speed of said blank.

14. Optical surface generating apparatus according to claim 13 including synchronizing means for maintaining a given relationship between the information sensed by said sensing means and the relative position existing between said surface modifying means and the work surface of the optical blank.

15. Optical surface generating apparatus according to claim 14 wherein said guide receiving means is adapted to receive a guide means comprising a physical representation of the optical blank's work surface.

16. Optical surface generating apparatus according to claim 15 including said guide means and wherein said guide means comprises an interferogram of the optical blank's work surface.

17. An optical surface generating method comprising the steps of examining the work surface of an optical blank recording on a guide means information relating to rotational asymmetries on said work surface, producing relative circumferential movement between a surface modifying means and said work surface, and varying the speed of said circumferential movement in response to the information recorded on said guide means.

18. An optical surface generating method according to claim 17 wherein said speed of said circumferential component is continuously varied dependent upon information representing the initial surface elevation of that portion of said work surface directly adjacent said surface modifying means.

19. An optical surface generating method according to claim 18 wherein said surface modifying means is operated to remove material from the adjacent portion of said work surface.

20. An optical surface generating method according to claim 19 wherein said speed of said circumferential component is varied inversely with respect to the relative initial elevations of said directly adjacent work surface portions.